UNITED STATES PATENT OFFICE.

LOUIS G. HARRIS, OF CANNING, NOVA SCOTIA, CANADA.

GAS-PRODUCING COMPOSITION.

No. 858,512.      Specification of Letters Patent.      Patented July 2, 1907.

Application filed January 11, 1906. Serial No. 295,627.

*To all whom it may concern:*

Be it known that I, LOUIS G. HARRIS, a subject of the King of Great Britain, residing at Canning, in the Province of Nova Scotia, Canada, have invented a new and useful Improvement in Gas-Producing Compositions, of which the following is a specification.

The object of this invention is to produce a composition of matter which is suitable for producing from kitchen garbage or other similar refuse material by distillation a combustible gas which is of great value both as an illuminant and as fuel.

In practicing my invention I proceed as follows:

I prepare a preliminary liquid mixture containing, approximately, equal parts, by weight, of vitriol, preferably sulfate of iron, caustic potash and caustic lime. These ingredients are thoroughly mixed, preferably by mixing them with a suitable quantity of hot water. For illustration, 4 pounds of each of these ingredients may be mixed with about 40 pounds of water and, preferably, a farinaceous substance, for instance, a cheap grade of flour, is also added to the mixture in about the proportion of 2 pounds of farinaceous material to 40 pounds of water. This preliminary mixture is mixed, after cooling, with 40 gallons of mineral oil, preferably crude petroleum or some inexpensive derivative of petroleum. The composition of matter so produced is added to the kitchen garbage or other refuse material in about the proportion of from 8—10 gallons of the composition to 2000 pounds of garbage. The above mentioned proportions will give excellent results, but are stated only approximately and may be varied more or less as the nature of the garbage or other material and other considerations may render expedient.

The farinaceous matter aids in causing a thorough commingling of the ingredients and a thorough emulsifying of the composition containing the mineral oil, the composition having approximately the consistency of milk. The vitriol materially increases the brilliancy and illuminating power of the gas, the flame of which is white and brilliant, while it has a greenish cast and is of less illuminating power when the vitriol is omitted. This ingredient also aids in the decomposition of the garbage during the distillation and renders the progress of the distillation more even and uniform. The lime assists in purifying the gas and the caustic potash shortens the period of distillation and enables the latter to be carried on satisfactorily under a comparatively low degree of heat, approximately from 1000—1200° F.

The caustic potash may be omitted, if desired, but this is not recommended as the composition produces more satisfactory results when this ingredient is used.

This composition is especially desirable for use in connection with kitchen garbage but may also be used with good results in connection with other similar refuse or inexpensive organic matter, for instance, sawdust, manure, peat, &c.

The composition is mixed with or sprinkled upon the garbage or other material in any suitable manner and the mixture is then distilled in a suitable retort and the resulting gas superheated and purified in any suitable manner. The gas so produced is a brilliant illuminant, has a high calorific value, and is therefore very desirable both as illuminating and fuel gas. The addition of the herein described composition to the garbage or other material which is to be distilled aids greatly in the decomposition of this material, facilitates the liberation of the gas and enables the material to be distilled with a minimum expenditure of heat, greatly increases the volume of the gas which is produced from a given quantity of material and produces a gas which is readily purified and which does not deposit sediment or condensation products in the pipes.

The gas so produced can be used either by itself or as an enricher for inferior gas.

I claim as my invention:

1. A composition of matter for admixture with garbage or other gas producing material, comprising mineral oil, vitriol, and a caustic substance, substantially as set forth.

2. A composition of matter for admixture with garbage or other gas producing material, comprising mineral oil, vitriol, and a farinaceous substance, substantially as set forth.

3. A composition of matter for admixture with garbage or other gas producing material, comprising mineral oil, vitriol, a caustic substance, and a farinaceous substance, substantially as set forth.

4. A composition of matter for admixture with garbage or other gas producing material, comprising mineral oil, sulfate of iron, potash and lime, substantially as set forth.

Witness my hand, this 20th day of December, 1905.

LOUIS G. HARRIS.

Witnesses:
  GEORGE HILL,
  W. B. MACCRE.